(12) United States Patent
Zarnoch et al.

(10) Patent No.: US 6,521,703 B2
(45) Date of Patent: Feb. 18, 2003

(54) CURABLE RESIN COMPOSITION, METHOD FOR THE PREPARATION THEREOF, AND ARTICLES DERIVED THEREFORM

(75) Inventors: Kenneth Paul Zarnoch, Scotia; Hua Guo, Selkirk, both of NY (US); Herbert Shin-I Chao, Paoli, PA (US)

(73) Assignee: General Electric Company, Pittsfield, MA (US)

( * ) Notice: Subject to any disclaimer, the term of this patent is extended or adjusted under 35 U.S.C. 154(b) by 2 days.

(21) Appl. No.: 09/765,065

(22) Filed: Jan. 17, 2001

(65) Prior Publication Data

US 2002/0016420 A1 Feb. 7, 2002

Related U.S. Application Data

(60) Provisional application No. 60/176,529, filed on Jan. 18, 2000.

(51) Int. Cl.$^7$ ................................................. C08L 67/06
(52) U.S. Cl. ........................... 525/17; 525/25; 525/27; 525/44; 525/48; 525/49; 525/36; 525/39; 525/40
(58) Field of Search .............................. 525/44, 48, 49, 525/36, 39, 40, 17, 25, 27

(56) References Cited

U.S. PATENT DOCUMENTS

| | | |
|---|---|---|
| 3,306,875 A | 2/1967 | Hay |
| 3,375,228 A | 3/1968 | Holoch et al. |
| 3,557,045 A | 1/1971 | Wright et al. |
| 3,637,578 A | 1/1972 | Wright et al. |
| 3,883,612 A | 5/1975 | Pratt et al. |
| 3,936,414 A | 2/1976 | Wright et al. |
| 4,048,143 A | 9/1977 | Hay et al. |
| 4,148,843 A | 4/1979 | Goossens |
| 4,165,422 A | 8/1979 | White |
| 4,327,013 A | 4/1982 | Peters |
| 4,562,243 A | 12/1985 | Percec |
| 4,565,684 A | 1/1986 | Tibbetts et al. |
| 4,572,813 A | 2/1986 | Arawaka |
| 4,634,742 A | 1/1987 | Percec |
| 4,663,230 A | 5/1987 | Tennent |
| 4,663,402 A | 5/1987 | Percec et al. |
| 4,665,137 A | 5/1987 | Percec |
| 4,677,185 A | 6/1987 | Heitz et al. |
| 4,701,514 A | 10/1987 | Percec |
| 4,760,118 A | 7/1988 | White et al. |
| H521 H | 9/1988 | Fan |
| 4,806,601 A | 2/1989 | Percec |
| 4,816,289 A | 3/1989 | Komatsu et al. |
| 4,816,515 A | 3/1989 | Weiss |
| 4,871,816 A | 10/1989 | Percec et al. |
| 4,874,826 A | 10/1989 | Sakamoto et al. |
| 4,876,078 A | 10/1989 | Arakawa et al. |
| 4,888,397 A | 12/1989 | van der Meer et al. |
| 4,923,932 A | 5/1990 | Katayose et al. |
| 5,024,818 A | 6/1991 | Tibbetts et al. |
| 5,039,781 A | 8/1991 | Neugebauer et al. |
| 5,071,922 A | 12/1991 | Nelissen et al. |
| 5,079,268 A | 1/1992 | Nelissen et al. |
| 5,091,480 A | 2/1992 | Percec |
| 5,112,914 A | 5/1992 | Mizuno et al. |
| 5,165,909 A | 11/1992 | Tennent et al. |
| 5,171,761 A | 12/1992 | Penco et al. |
| 5,213,886 A | 5/1993 | Chao et al. |
| 5,218,030 A | 6/1993 | Katayose et al. |
| 5,219,951 A | 6/1993 | Nelissen et al. |
| 5,241,015 A | 8/1993 | Chou |
| 5,304,600 A | 4/1994 | Nelissen et al. |
| 5,310,820 A | 5/1994 | Nelissen et al. |
| 5,332,801 A | 7/1994 | Tsukahara et al. |
| 5,338,796 A | 8/1994 | Vianello et al. |
| 5,352,745 A | 10/1994 | Katayose et al. |
| 5,407,972 A | 4/1995 | Smith et al. |
| 5,589,152 A | 12/1996 | Tennent et al. |
| 5,591,382 A | 1/1997 | Nahass et al. |
| 5,834,565 A | 11/1998 | Tracy et al. |
| 5,851,646 A | 12/1998 | Takahashi et al. |
| 5,965,663 A | 10/1999 | Hayase |
| 6,022,550 A | 2/2000 | Watanabe |
| 6,306,963 B1 | 10/2001 | Lane et al. |
| 6,352,782 B2 | 3/2002 | Yeager et al. |
| 6,384,176 B1 | 5/2002 | Braat et al. |
| 2001/0053820 A1 | 12/2001 | Yeager et al. |

FOREIGN PATENT DOCUMENTS

| | | |
|---|---|---|
| DE | 3117514 A1 | 1/1982 |
| DE | 4103140 A1 | 8/1992 |
| EP | 0 385 065 A1 | 1/1990 |
| EP | 0 261 574 B1 | 11/1991 |
| EP | 0 498 088 A1 | 12/1991 |
| NL | 8902092 | 8/1989 |
| WO | WO 93/13251 | 7/1993 |
| WO | WO 01/40354 A1 | 7/2001 |

OTHER PUBLICATIONS

"Plastic Additives Handbook, 4th Edition" R. Gachter and H. Muller (eds.), P.P. Klemchuck (assoc. ed) Hansen Publishers, New York 1993; pp. 914–935.

S. J. Monte et al. in Ann. Chem. Tech Conf. SPI (1980), Ann. Tech. Conf. Reinforced Plastics and Composite inst. SPI 1979, Section 16E, New Orleans; pp. 1–11.

S. J. Monte and G. Sugerman, "Coupling composites with titanate during extrusion processing" Mod. Plastics Int.; May (1984); 61 (5); pp. 74, 76, 78.

Cohen, L. B. "Zircoaluminates strengthen premium ranges of chemical coupling agents" Plastics Engineering; vol. 39; No. 11; Nov. 1983; pp. 29–32.

Derwent Abstract Record for JP08245872.

Wen Li et al: "Shrinkage control of low–profile unsaturated polyester resins cured at low temperature" Polymer, GB, Elsevier Science Publishers B.V, vol. 39, No. 23, Nov. 1, 1998 (Nov. 1, 1998), pp. 5677–5687.

(List continued on next page.)

Primary Examiner—Patricia A. Short

(57) ABSTRACT

A curable resin composition includes an unsaturated polyester, an alkenyl aromatic compound, and a capped poly(arylene ether). The composition is suitable for low temperature curing and exhibits reduced curing shrinkage and reduced brittleness.

32 Claims, 3 Drawing Sheets

OTHER PUBLICATIONS

Derwent Abstract for JP 08–245872.
U.S. patent application Ser. No. 09/683,214, Yeager et al., filed Dec. 3, 2001.
U.S. patent application Ser. No. 09/683,352, Braat et al., filed Dec. 18, 2001.
U.S. patent application Ser. No. 09/681,376, Zarnoch et al., filed Mar. 27, 2001.
U.S. patent application Ser. No. 10/063,292, Merfeld et al., filed Apr. 9, 2002.
U.S. patent application Ser. No. 10/119,406, Yeager et al., filed Apr. 9, 2002.
U.S. patent application Ser. No. 09/681,381, Teutsch et al., filed Mar. 27, 2001.
U.S. patent application Ser. No. 10,063,152, Braat et al., filed Mar. 26, 2002.

CURABLE RESIN COMPOSITION, METHOD FOR THE PREPARATION THEREOF, AND ARTICLES DERIVED THEREFORM

CROSS REFERENCE TO RELATED APPLICATIONS

This application claims the benefit of U.S. Provisional Patent Application Serial No. 60/176,529, filed Jan. 18, 2000.

BACKGROUND OF THE INVENTION

The present invention relates to curable resin compositions. In particular, the invention relates to curable resin compositions exhibiting reduced volume change on curing.

Thermosetting resins in general, and unsaturated polyester resins in particular, are useful in a variety of applications, including structural automotive parts, building and construction components, and boat hulls. In a typical sheet molding compound (SMC) formulation, the unsaturated polyester comprises only about 8 to 15% of the total formulation. Other components include a crosslinking agent such as styrene monomer, fillers such as calcium carbonate, glass fiber, thickeners, mold release agents, low profile additives, initiators, co-promoters, and inhibitors. Unsaturated polyester resins may exhibit excellent physical properties and solvent resistance, as well as good weatherability.

Notwithstanding these advantages, the commercial adoption of unsaturated polyester resins has been limited by a number of deficiencies, including (1) poor surface appearance, including fiber patterns, (2) warpage of molded parts, (3) difficulty molding to close tolerances, (4) internal cracks and voids, particularly in thick sections, and (5) notable depressions (sink marks) opposite reinforcing ribs and bosses. These deficiencies are thought to be caused by the high polymerization shrinkage from the copolymerization of the unsaturated polyester resin with the crosslinking agent. The shrinkage causes the compound to pull away from the mold surface.

In a normal high-temperature-curing cycle, the liquid resin is heated to temperatures in excess of 140° C., resulting in a thermally induced expansion. As the unsaturated polyester resin begins to crosslink and the unsaturated components become consumed there is a negative volume change due to the density difference. Once reaction is complete, the system is cooled to ambient condition, causing a further negative volume change. A neat polyester resin will typically exhibit as much as a negative 7% volume change on high-temperature curing.

Although many approaches have been taken to reduce curing shrinkage, including changes in resin and co-monomer structures, use of large amounts of filler, and even partial polymerization before molding, these approaches have been inadequate. Another approach has been the addition of certain thermoplastics to the formulation. These thermoplastics, when functioning in such a role, are commonly referred to as low-profile additives (LPAs). Known LPAs include polymethyl methacrylates, vinyl chloride-vinyl acetate copolymers, polyurethanes, and styrene-butadiene copolymers.

The generally accepted mechanism for shrinkage control relies on induced strain relief through stress cracking of the separate LPA phase within the thermoset matrix. Many known LPAs have a high molecular weight and are polar in nature to improve compatibility with the uncured resin. During curing (crosslinking), as the resin polarity decreases, the LPA is rejected from the matrix and isolated as solid domains, typically less than about 5 micrometers in size. These distinct LPA domains dispersed in the cured thermoset matrix act as strain relief sites. Thus when the strain increases it can induce preferential stress cracking through the weak thermoplastic phase, thus relieving the strain, forming voids and compensating for the overall shrinkage.

However, in low temperature curing applications, known LPAs are not as effective. Thus, there is a need for a shrinkage control and stress release agent for low-temperature curing applications.

BRIEF SUMMARY OF THE INVENTION

Figure 1:
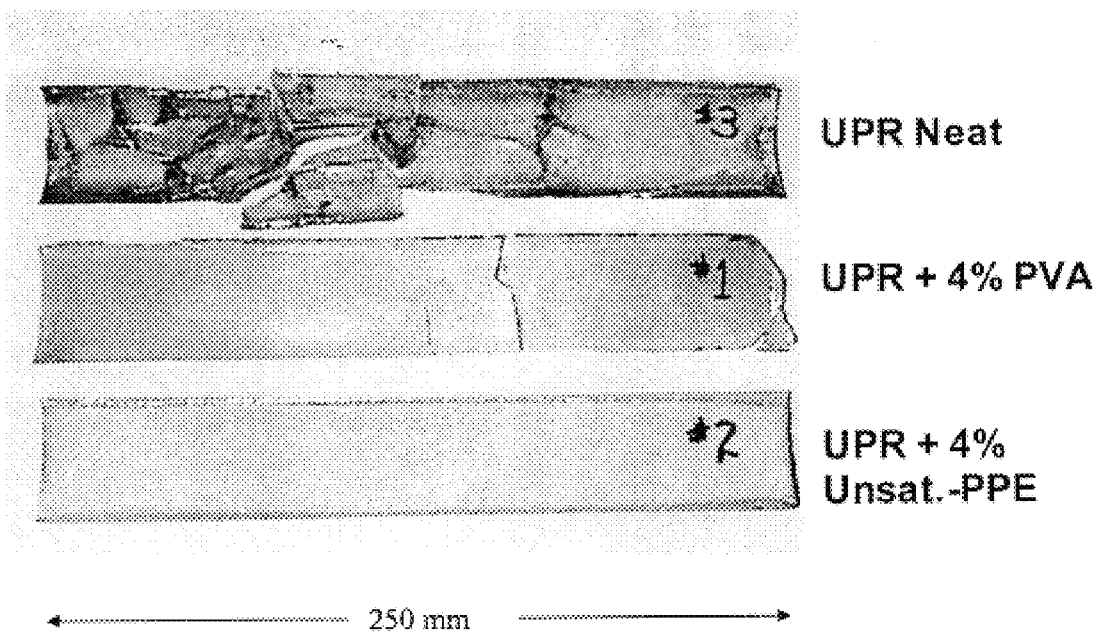
FIG. 1 is an image of molded unsaturated polyester resin (UPR) with no low-profile additive (#3), with polyvinyl acetate (#1), and with a capped poly(arylene ether) (#2). See Examples 1–6 and Comparative Examples 1–6.

The above-described and other drawbacks and disadvantages of the prior art are alleviated by a curable resin composition, comprising:

an unsaturated polyester;

an alkenyl aromatic monomer; and an amount of a capped poly(arylene ether) effective to reduce curing shrinkage.

The present inventors have found capped poly(arylene ether)s are more effective at reducing shrinkage and relieving stress than commercially available LPAs.

DETAILED DESCRIPTION OF THE PREFERRED EMBODIMENTS

A curable resin composition comprises:

an unsaturated polyester;

an alkenyl aromatic monomer; and an amount of a capped poly(arylene ether) effective to reduce curing shrinkage.

The composition comprises an unsaturated polyester. An unsaturated polyester is generally obtained by reaction of at least one polyhydric alcohol with at least one polybasic acid comprising an unsaturated polybasic acid.

Specific examples of unsaturated polybasic acids that may be used to form the unsaturated polyester include maleic anhydride, maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, and the like, as well as their corresponding acids, esters, and anhydrides. Preferred unsaturated acids include maleic acid, fumaric acid, and their esters and anhydrides.

Often, polyfunctional saturated and aromatic acids are employed in conjunction with the polybasic unsaturated acids to reduce the density of the ethylenic unsaturation and provide the desired chemical and mechanical properties to the coating. Examples of saturated and aromatic polybasic acids include succinic acid, adipic acid, sebacic acid, azelaic acid, dodecanedioic acid, eicoic acid, phthalic acid, isophthalic acid, terephthalic acid, and the like, as well as their esters and anhydrides. Preferred aromatic polybasic acids include phthalic acid, isophthalic acid, and their esters and anhydrides. Examples of polyhydric alcohols include ethylene glycol, propylene glycol, diethylene glycol, dipropylene glycol, 1,2-butanediol, 1,3-butanediol, 1,4-butanediol, neopentyl glycol, glycerol, triethylene glycol, pentanediol, hexylene glycol, hydrogenated bisphenol A, bisphenol A-alkylene oxide adducts, tetrabromobisphenol A-alkylene oxide adducts, and the like. Preferred polyhydric alcohols include propylene glycol.

Unsaturated polyesters are commercially available, often as compositions further comprising an alkenyl aromatic monomer, and include, for example, the unsaturated polyester resins obtained from Ashland as Ashland Q6585, and from Alpha Owens Corning as AOC-XV2346.

The composition may comprise the unsaturated polyester in an amount of about 20 to about 80 parts, preferably about 30 to about 75 parts, more preferably about 40 to about 70 parts, per 100 parts resin. Unless otherwise specified, all parts are parts by weight.

In addition to the unsaturated polyester, the composition further comprising an alkenyl aromatic monomer. The alkenyl aromatic monomer may have the structure

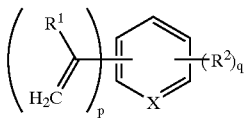

wherein each $R^1$ may be hydrogen, $C_1-C_{12}$ alkyl, or the like; each $R^2$ may be halogen, $C_1-C_{12}$ alkyl, $C_1-C_{12}$ alkoxyl, or the like; X is nitrogen or carbon; p is 1 to 4; and q is 0 to 5. When p=1, the alkenyl aromatic monomer is termed a monofunctional alkenyl aromatic monomer; when p=2–4, the alkenyl aromatic monomer is termed a polyfunctional alkenyl aromatic monomer. Suitable alkenyl aromatic monomers include styrene, alpha-methylstyrene, alpha-ethylstyrene, alpha-isopropylstyrene, alpha-tertiary-butylstyrene, alpha-phenylstyrene, and the like; halogenated styrenes such as chlorostyrene, dichlorostyrene, trichlorostyrene, bromostyrene, dibromostyrene, tribromostyrene, fluorostyrene, difluorostyrene, trifluorostyrene, tetrafluorostyrene, pentafluorostyrene, and the like; halogenated alkylstyrenes such as chloromethylstyrene, and the like; alkoxystyrenes such as methoxystyrene, ethoxystyrene, 1,3-divinylbenzene, 1,4-divinylbenzene, trivinylbenzene, 1,3-diisopropenylbenzene, 1,4-diisopropenylbenzene, and the like; vinylpyridine, 2,4-divinylpyridine, 2,5-divinylpyridine, 2,6-divinylpyridine, 3,5-divinylpyridine, 2,4,6-trivinylpyridine, and the like; and mixtures comprising at least one of the foregoing alkenyl aromatic monomers. In the foregoing substituted styrenes for which no substituent position is specified, the substituent may occupy any free position on the aromatic ring.

Preferred alkenyl aromatic monomers include styrene, alpha-methylstyrene, 2-methylstyrene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropenylbenzene, 1,4-diisopropenylbenzene, and the like, and mixtures comprising at least one of the foregoing alkenyl aromatic monomers. Preferred alkenyl aromatic monomers further include styrenes having from 1 to 5 halogen substituents on the aromatic ring, and mixtures comprising at least one such halogenated styrene.

The composition may comprise the alkenyl aromatic monomer in an amount of about 10 to about 70 parts, preferably about 20 to about 60 parts, more preferably about 30 to about 60 parts, per 100 parts resin.

In addition to the unsaturated polyester and the alkenyl aromatic monomer, the curable resin composition comprises a capped poly(arylene ether). A capped poly(arylene ether), is defined herein as a poly(arylene ether) in which at least 10%, preferably at least 50%, more preferably at least 75%, yet more preferably at least 90%, even more preferably at least 95%, of the free hydroxyl groups present in the corresponding uncapped poly(arylene ether) have been removed by reaction with a capping agent.

There is no particular limitation on the intrinsic viscosity of the capped poly(arylene ether). The poly(arylene ether) may have an intrinsic viscosity of about 0.05 to about 0.80, as measured in chloroform at 23° C. In a preferred embodiment, the intrinsic viscosity may be about 0.08 to about 0.40 deciliters per gram (dl/g), preferably about 0.10 to about 0.35 dl/g, more preferably about 0.12 to about 0.31 dl/g. Generally, the intrinsic viscosity of the capped poly (arylene ether) will vary insignificantly from the intrinsic viscosity of the corresponding uncapped poly(arylene ether). It is expressly contemplated to employ blends of at least two capped poly(arylene ether)s having different molecular weights and intrinsic viscosities.

The capped poly(arylene ether) may be represented by the structure

wherein Q is the residuum of a monohydric, dihydric, or polyhydric phenol, preferably the residuum of a monohydric or dihydric phenol, more preferably the residuum of a monohydric phenol; y is 1 to 100; J comprises recurring units having the structure

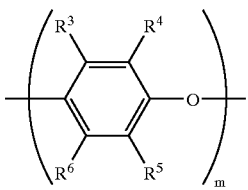

wherein $R^3-R^6$ may be hydrogen, halogen, primary or secondary $C_1-C_{12}$ alkyl, $C_1-C_{12}$ alkenyl, $C_1-C_{12}$ alkynyl, $C_1-C_{12}$ aminoalkyl, $C_1-C_{12}$ hydroxyalkyl, phenyl, $C_1-C_{12}$ haloalkyl, $C_1-C_{12}$ aminoalkyl, $C_1-C_{12}$ hydrocarbonoxy, $C_1-C_{12}$ halohydrocarbonoxy wherein at least two carbon atoms separate the halogen and oxygen atoms, or the like; m is 1 to about 200; and K is a capping group produced by reaction of the phenolic hydroxyl groups on the poly(arylene ether) with a capping reagent. The resulting capping group may be selected from the group consisting of

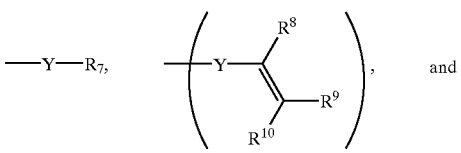

-continued

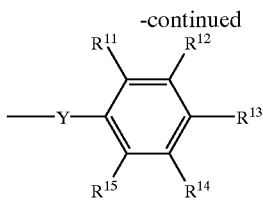

wherein $R^7$ may be $C_1$–$C_{12}$ alkyl, or the like; $R^8$–$R^{10}$ may be hydrogen, $C_1$–$C_{12}$ alkyl, $C_1$–$C_{12}$ alkenyl, $C_1$–$C_{12}$ aryl, $C_1$–$C_{12}$ mixed (alkyl-aryl), $C_1C_{12}$ alkoxycarbonyl, $C_1$–$C_{12}$ aryloxycarbonyl, mixed (alkyl-aryl)oxycarbonyl, nitrile, formyl, carboxylate, imidate, thiocarboxylate, or the like; $R^{11}$–$R^{15}$ may be hydrogen, halogen, $C_1$–$C_{12}$ alkyl, hydroxy, amino, or the like; and wherein Y is a divalent group selected from the group consisting of

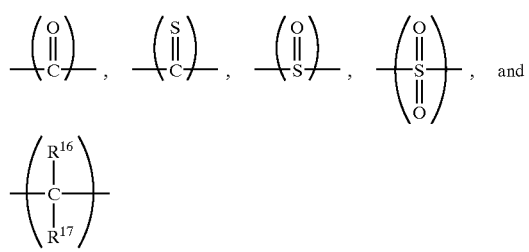

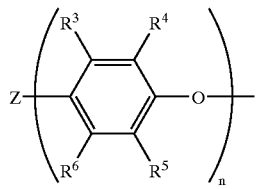

wherein $R^{16}$ and $R^{17}$ may be hydrogen, $C_1$–$C_{12}$ alkyl, or the like.

In one embodiment, Q is the residuum of a phenol, including polyfunctional phenols, and includes radicals of the structure

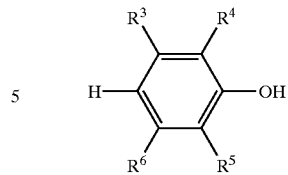

wherein $R^3$–$R^6$ may be hydrogen, halogen, primary or secondary $C_1$–$C_{12}$ alkyl, $C_1$–$C_{12}$ alkenyl, $C_1$–$C_{12}$ alkynyl, $C_1$–$C_1$2 aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, $C_1$–$C_{12}$ halohydrocarbonoxy wherein at least two carbon atoms separate the halogen and oxygen atoms, or the like; Z may be hydrogen, $C_{1-20}$ alkyl, aryl, mixed alkyl-aryl hydrocarbons, such hydrocarbon groups containing a substituent selected from the group consisting of carboxylic acid, aldehyde, alcohol, and amino radicals, or the like; Z also may be sulfur, sulfonyl, sulfuryl, oxygen, or other such bridging group having a valence of 2 or greater to result in various bis- or higher polyphenols; n is 1 to about 100, preferably 1 to 3, and most preferably 1 or 2.

In one embodiment, the capped poly(arylene ether) is produced by capping an uncapped poly(arylene ether) consisting essentially of the polymerization product of at least one monohydric phenol having the structure wherein $R^3$–$R^6$ may be hydrogen, halogen, primary or secondary $C_1$–$C_{12}$ alkyl, $C_1$–$C_{12}$ alkenyl, $C_1$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, $C_1$–$C_{12}$ halohydrocarbonoxy wherein at least two carbon atoms separate the halogen and oxygen atoms, or the like. Suitable monohydric phenols include those described in U.S. Pat. No. 3,306,875 to Hay, and highly preferred monohydric phenols include 2,6-dimethylphenol and 2,3,6-trimethylphenol.

In a preferred embodiment, the capped poly(arylene ether) comprises at least one capping group having the structure

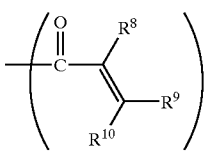

wherein $R^8$–$R^{10}$ may be hydrogen, $C_1$–$C_{12}$ alkyl, $C_1$–$C_{12}$ alkenyl, $C_1$–$C_{12}$ aryl, $C_1$–$C12$ mixed (alkyl-aryl), $C_1$–$C_{12}$ alkoxycarbonyl, $C_1$–$C_{12}$ aryloxycarbonyl, mixed (alkyl-aryl)oxycarbonyl, nitrile, formyl, carboxylate, imidate, thiocarboxylate, or the like. Highly preferred capping groups include acrylate ($R^8$=$R^9$=$R^{10}$=hydrogen) and methacrylate ($R^8$=methyl, $R^9$=$R^{10}$=hydrogen).

In another preferred embodiment, the capped poly (arylene ether) comprises at least one capping group having the structure

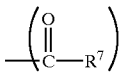

wherein $R^7$ is $C_1$–$C_{12}$ alkyl, preferably $C_1$–$C_6$ alkyl, more preferably methyl or isopropyl.

In yet another preferred embodiment, the capped poly (arylene ether) comprises at least one capping group having the structure

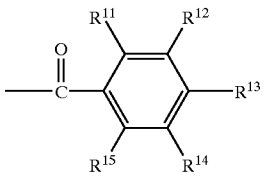

wherein $R^{11}$–$R^{15}$ may be hydrogen, halogen, $C_1$–$C_{12}$ alkyl, hydroxy, amino, or the like. Preferred capping groups of this type include salicylate ($R^9$=hydroxy, $R^{10}$–$R^{13}$=hydrogen).

In a preferred embodiment, the capped poly(arylene ether) is substantially free of amino substituents, including alkylamino and dialkylamino substituents, wherein substantially free means that the capped poly(arylene ether) contains less than about 300 micrograms, preferably less than about 100 micrograms, of atomic nitrogen per gram of capped poly(arylene ether). Although many poly(arylene ether)s are synthesized by processes that result in the incorporation of amino substituents, the present inventors have found that thermoset curing rates are increased when the capped poly(arylene ether) is substantially free of amino substituents. Poly(arylene ether)s substantially free of amino substituents may be synthesized directly or generated by heating amino-substituted poly(arylene ether)s to at least about 200° C.

There is no particular limitation on the method by which the capped poly(arylene ether) is prepared. The capped poly(arylene ether) may be formed by the reaction of an uncapped poly(arylene ether) with a capping agent. Capping agents include compounds known in the literature to react with phenolic groups. Such compounds include both monomers and polymers containing, for example, anhydride, acid chloride, epoxy, carbonate, ester, isocyanate, cyanate ester, or alkyl halide radicals. Capping agents are not limited to organic compounds as, for example, phosphorus and sulfur based capping agents also are included. Examples of capping agents include, for example, acetic anhydride, salicylic anhydride, polyesters comprising salicylate units, homopolyesters of salicylic acid, acrylic anhydride, methacrylic anhydride, glycidyl acrylate, glycidyl methacrylate, acetyl chloride, benzoyl chloride, diphenyl carbonates such as di(4-nitrophenyl)carbonate, acryloyl esters, methacryloyl esters, acetyl esters, phenylisocyanate, 3-isopropenyl-alpha, alpha-dimethylphenylisocyanate, cyanatobenzene, 2,2-bis (4-cyanatophenyl)propane), 3-(alpha-chloromethyl)styrene, 4-(alpha-chloromethyl)styrene, allyl bromide, and the like, carbonate and substituted derivatives thereof, and mixtures thereof. These and other methods of forming capped poly (arylene ether)s are described, for example, in U.S. Pat. No. 3,375,228 to Holoch et al.; U.S. Pat. No. 4,148,843 to Goossens; U.S. Pat. Nos. 4,562,243, 4,663,402, 4,665,137, and 5,091,480 to Percec et al.; U.S. Pat. Nos. 5,071,922, 5,079,268, 5,304,600, and 5,310,820 to Nelissen et al.; U.S. Pat. No. 5,338,796 to Vianello et al.; and European Patent No. 261,574 B1 to Peters et al.

In a preferred embodiment, the capped poly(arylene ether) may be prepared by reaction of an uncapped poly (arylene ether) with an anhydride in the alkenyl aromatic monomer as solvent. This approach has the advantage of generating the capped poly(arylene ether) in a form that can be immediately blended with other components to form a curable composition; using this method, no isolation of the capped poly(arylene ether) or removal of unwanted solvents or reagents is required.

A capping catalyst may be employed in the reaction of an uncapped poly(arylene ether) with an anhydride. Examples of such compounds include those known to the art that are capable of catalyzing condensation of phenols with the capping agents described below. Useful materials are basic compounds including, for example, basic compound hydroxide salts such as sodium hydroxide, potassium hydroxide, tetraalkylammonium hydroxides, and the like; tertiary alkyl amines such as tributyl amine, triethylamine, dimethylbenzylamine, dimethylbutylamine and the like; tertiary mixed alkyl-arylamines and substituted derivatives thereof such as dimethylaniline, and the like; heterocyclic amines such as imidazoles, pyridines, and substituted derivatives thereof such as 2-methylimidazole, 2-vinylimidazole, 4-(dimethylamino)pyridine, 4-(pyrrolino) pyridine, 2-, 3-, or 4-vinylpyridine. Also useful are organometallic salts such as, for example, tin and zinc salts known to catalyze the condensation of, for example, isocyanates or cyanate esters with phenols. The organometallic salts useful in this regard are known to the art in numerous publications and patents well known to those skilled in this art.

The composition may comprise a blend of at least two capped poly(arylene ether)s. Such blends may be prepared from individually prepared and isolated capped poly(arylene ether)s. Alternatively, such blends may be prepared by reacting a single poly(arylene ether) with at least two capping agents.

The capped poly(arylene ether) may be used an any amount effective to reduce the curing shrinkage of the composition compared to the curing shrinkage of the corresponding composition without the capped polyarylene ether.

The curing shrinkage of a cured object comprising the composition may be defined by the equation $$S = 100\left(\frac{L_{before} - L_{after}}{L_{before}}\right)$$

wherein S is the curing shrinkage expressed as a percent, $L_{before}$ is the length before curing of a molded object comprising the composition, and $L_{after}$ is the length after curing of a molded object comprising the composition. In a preferred embodiment, the capped poly(arylene ether) is used in an amount effective to produce shrinkage in any one dimension not greater than about 3%, preferably not greater than about 2%, more preferably not greater than about 1%. In some cases the addition of the capped poly(arylene ether) may result in expansion after curing, which leads to a negative value of S. In such cases, it is preferred that the curing shrinkage not be less than about −3%, more preferably not less than about −2%, yet more preferably not less than about −1%.

Shrinkage of the composition may be expressed relative to the shrinkage of the corresponding composition without the capped poly(arylene ether). Thus, shrinkage reduction may be defined by the equation $$SR = 100\left|\frac{S_{-cappedPPE} - S_{+cappedPPE}}{S_{-cappedPPE}}\right|$$

where SR is the shrinkage reduction expressed as a percentage, $S_{+cappedPPE}$ is the curing shrinkage, as defined above, of a molded object comprising the composition with the capped poly(arylene ether), and $S_{-cappedPPE}$ is the curing shrinkage of a molded object comprising the corresponding composition without the capped poly(arylene ether). It is preferred that the capped poly(arylene ether) be used in an amount effective to produce a shrinkage reduction of at least about 25%, preferably at least about 50%, more preferably at least about 75%. In the instances in which the composition without capped poly(arylene ether) exhibits curing shrinkage and the composition with capped poly(arylene ether) exhibits curing expansion, the value of SR will exceed 100%. As it may sometimes be desirable for the composition to exhibit slight expansion on curing, it is preferred that the capped poly(arylene ether) be used in an amount effective to produce a shrinkage reduction not greater than about 150%, more preferably not greater than about 125%, yet more preferably not greater than about 110%.

The effective amount of the capped poly(arylene ether) will depend on the nature and amount of the unsaturated polyester, the nature and amount of the alkenyl aromatic monomer, and the nature of the capped poly(arylene ether), as well as the curing conditions. Generally, the composition may comprise the capped poly(arylene ether) in an amount of about 0.1 to about 12 parts, preferably about 0.5 to about 10 parts, more preferably about 1 to about 8 parts, per 100 parts resin.

In addition to the components discussed above, the curable resin composition may, optionally, further comprise a curing catalyst. Curing catalysts, also referred to as initiators, are well known to the art and used to initiate the polymerization, cure or crosslink any of numerous thermoplastics and thermosets including unsaturated polyester, vinyl ester and allylic thermosets. Non-limiting examples of curing catalysts are those described in "Plastic Additives Handbook, 4$^{th}$ Edition" R. Gachter and H. Muller (eds.), P. P. Klemchuck (assoc. ed.) Hansen Publishers, New York 1993 and in U.S. Pat. No. 5,407,972 to Smith et al., and U.S. Pat. No. 5,218,030 to Katayose et al. The curing catalyst for the unsaturated portion of the thermoset may include any compound capable of producing radicals. Such curing catalysts may include both peroxy and non-peroxy based radical initiators. Examples of peroxy initiators useful in the present invention include, for example, benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl) benzene, 2,5-dimethyl-2,5-di(t-butylperoxy)hexane, dicumylperoxide, di(t-butylperoxy isophthalate, t-butylperoxybenzoate, 2,2-bis(t-butylperoxy)butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, and the like, and mixtures comprising at least one of the foregoing curing agents. Typical non-peroxy initiators include, for example, 2,3-dimethyl-2,3-diphenylbutane, 2,3-trimethylsilyloxy-2,3-diphenylbutane, and the like, and mixtures comprising at least one of the foregoing curing catalysts.

In a preferred embodiment, the curing catalyst may comprise t-butyl peroxybenzoate and/or methyl ethyl ketone peroxide. The curing catalyst will preferably promote curing at a temperature of about 0° C. to about 200° C., preferably about 20° C. to about 50° C., more preferably about 25° C. to about 40° C.

When present, the curing catalyst may be used in an amount of about 0.1 to about 10 parts, preferably about 0.2 to about 5 parts, more preferably about 0.5 to about 2 parts, per 100 parts resin.

The composition may, optionally, further comprise a curing promoter to decrease the gel time. Suitable curing promoters include transition metal salts and complexes such as cobalt naphthanate and cobalt ethylhexanoate; and organic bases such as N,N-dimethylaniline (DMA) and N,N-diethylaniline (DEA). In one embodiment, cobalt naphthanate and DMA are used in combination. When present, the curing promoter may be used in an amount of about 0.01 to about 1 parts, preferably about 0.02 to about 0.5 parts, more preferably about 0.05 to about 0.2 parts, per 100 parts resin.

When the composition is to be cured using ultraviolet light, it may further comprise a photoinitiator, such as, for example, the photoinitiators described in U.S. Pat. No. 5,407,972, including, for example, ethyl benzoin ether, isopropyl benzoinether, butyl benzoin ether, isobutyl benzoin ether, alpha,alpha-diethoxyacetophenone, alpha,alpha-dimethoxy-alpha-phenylacetophenone, diethoxyphenylacetophenone, 4,4'-dicarboethoxybenzoin ethylether, benzoin phenyl ether, alpha-methylbenzoin ethyl ether alpha-methylolbenzoin methyl ether, trichloroacetophenone, and the like, and mixtures comprising at least one of the foregoing photoinitiators.

The composition may further comprise additives known in the art, including, for example, flame retardants, flame retardant synergists, mold release agents and other lubricants, antioxidants, thermal stabilizers, ultraviolet stabilizers, pigments, dyes, colorants, anti-static agents, fibrous reinforcements, disc-shaped fillers, low-aspect ratio fillers, synthetic and/or natural resins including thermoplastic elastomers, additional low profile additives, and the like.

Flame retardant compounds include those known to the art as described in numerous publications and patents known to those skilled in this art. Useful in formulating flame retardant compositions are, for example, brominated flame retardant compounds. Preferred brominated flame retardant compounds include, for example, 1,3,5-tris(2,4,6-tribromophenoxy)triazine, polybrominated diphenyl ethers, poly(2,6-dibromophenylene ether), brominated polystyrene, brominated cyclododecane, brominated bisphenol-A diglycidyl ether, hydroxyethyl ether, $C_{1-100}$ aromatic or mixed aromatic-aliphatic phosphate esters such as triphenyl, tricresyl phosphate, tris(2-allylphenylphosphate), tris(2-methoxy-4-allylphosphate), tris(2-propenylphenyl) phosphate, tris(4-vinylphenyl)phosphate bis (diphenylphosphate ester)s of bisphenols such as bisphenol-A, resorcinol or hydroquinone or the bis(diphenyl phosphoramide)s of diamines such as 1,6-hexanediamine or piperidine, and alkylated or substituted derivatives therefrom. If brominated flame retardants are used, it is preferred that the bromine content of the brominated flame retardant be greater than 45%, advantageously greater than 60%, and preferably greater than 70%. The high bromine content of the flame retardant allows one to obtain UL-94 flammability and at the same time maintaining high poly(arylene ether) content and optimal dielectric properties.

Useful fillers and reinforcements include those known to the art known to augment or modify the properties of plastics. Examples of such fillers well known to the art include those described in "Plastic Additives Handbook, 4$^{th}$ Edition" R. Gachter and H. Muller (eds.), P. P. Klemchuck (assoc. ed.) Hansen Publishers, New York 1993. Non-limiting examples of fillers include silica powder, such as fused silica and crystalline silica; boron-nitride powder and boron-silicate powders for obtaining cured products having low dielectric constant and low dielectric loss tangent; the above-mentioned powder as well as alumina, and magnesium oxide (or magnesia) for high temperature conductivity; and fillers, such as wollastonite including surface-treated wollastonite, calcium sulfate (as its anhydride, dihydrate or trihydrate), calcium carbonate including chalk, limestone, marble and synthetic, precipitated calcium carbonates, generally in the form of a ground particulate which often comprises 98+ weight % $CaCO_3$ with the remainder being other inorganics such as magnesium carbonate, iron oxide and alumino-silicates; surface-treated calcium carbonates; talc, including fibrous, modular, needle shaped, or, preferably, lamellar talc; glass spheres, both hollow and solid, and surface-treated glass spheres typically having coupling agents such as silane coupling agents and/or containing a conductive coating; and kaolin, including hard, soft, calcined kaolin, and kaolin comprising various coatings known to the art to facilitate the dispersion in and compatibility with the thermoset resin; mica, including metallized mica and mica surface treated with aminosilanes or acryloylsilanes coatings to impart good physicals to compounded blends; feldspar and nepheline syenite; silicate spheres; flue dust; cenospheres; finite; aluminosilicate (armospheres), including silanized and metallized aluminosilicate; natural silica sand, quartz; quartzite; perlite; Tripoli; diatomaceous earth; synthetic silica, including those with various silane coatings, and the like.

The above fillers may be used in metallized or silane coated forms to improve compatibility and adhesion with the thermoset blend.

Other mineral fillers include silicon carbide to increase the abrasive action of polymers; molybdenum sulfide to improve the lubricity, zinc sulfide to impart a white coloration; aluminum silicate (mullite), synthetic calcium silicate and zirconium silicate to improve slip properties; barium titanate to enhance dielectric properties; barium ferrite to produce magnetized polymers; and barium sulfate and heavy spar.

Fillers also include metals and metal oxides, including particulate or fibrous aluminum, bronze, zinc, copper, and nickel to improve, for example, thermal, electrical conductivity or resistance to neutron or gamma rays. Aluminum hydroxide may be incorporated to improve the flammability of a polymer resin.

Fillers also include carbon, such as carbon black for use as a potential colorant or to achieve improved volume conductivity (conductive carbon black) and heat deflection temperature. Graphite, such as graphite powder may be used to impart lubricity and/or conductivity to the formulation.

Fillers also include flaked fillers and reinforcements, such as glass flakes, flaked silicon carbide, aluminum diboride, aluminum flakes, and steel flakes.

Fillers also include short inorganic fibers, including processed mineral fibers such as those derived from blends comprising at least one of aluminum silicates, aluminum oxides, magnesium oxides, and calcium sulfate hemihydrate.

Fillers also include natural fillers and reinforcements, such as wood flour obtained by pulverizing wood, and fibrous products such as cellulose, cotton, sisal, jute, starch, cork flour, lignin, ground nut shells, corn, rice grain husks.

Fillers also include synthetic reinforcing fibers including polyesters such as polyethylene terephthalate, polyvinylalcohol; and high tenacity fibers with high thermal stability, including basalt fibers, carbon fibers, aromatic polyamide fibers, polybenzimidazole, also polyimide fibers such as polyimide 2080 and PBZ fiber (both products of Dow Chemical Company, Midland, Mich. USA). polyphenylene sulfide fiber, polyether ether ketone, boron fibers, ceramic fibers such as silicon carbide, and fibers from mixed oxides of aluminum, boron and silicon sold under the trade name "Nextel" by 3M Co., St. Paul, Minn., USA.

Fillers also include single crystal fibers or "whiskers", including silicon carbide, alumina, boron carbide, carbon, iron, nickel, and copper.

Fillers also include electrically conductive polymers, such as polypyrrole, polyaniline, polyphenylene, polyacetylene, and substituted derivatives there of, including derivatives substituted with $C_1$–$C_{25}$ alkyl, $C_1$–$C_{25}$ alkoxy, $C_1$–$C_{25}$ alkylcarbonyl, $C_1$–$C_{25}$ alkylcarbonyloxy, $C_6$–$C_{25}$ aryl, $C_6$–$C_{25}$ aryloxy, $C_6$–$C_{25}$ arylcarbonyl, and $C_6$–$C_{25}$ arylcarbonyloxy.

Fillers also include fibers, including textile glass fibers such as E, A, C., ECR, R, S, D, and NE glasses and quartz.

These aforementioned fillers may be added to the thermosetting resin without any treatment, or after surface treatment, generally with an adhesion promoter.

The formulation may also contain adhesion promoters to improve adhesion of the thermosetting resin to the filler or to an external coating or substrate. Also possible is treatment of the aforementioned inorganic fillers may be treated with and adhesion promoter to improve adhesion. Adhesion promoters include chromium complexes, silanes, titanates, zirco-aluminates, propylene maleic anhydride copolymers, reactive cellulose esters and the like. Chromium complexes include those once sold under the tradename VOLAN® are included. Silanes include molecules having the general structure $(RO)_{(4-n)}SiY_n$ wherein n=1–3, R is an alkyl or aryl group and Y is a reactive functional group which can enable formation of a bond with a polymer molecule. Particularly useful examples of coupling agents are those having the structure $(RO)_3SiY$. Typical examples include vinyltriethoxysilane, vinyl tris(2-methoxy)silane, g-methacryloxypropyltrimethoxy silane, g-aminopropyltriethoxysilane, g-glycidoxypropyltrimethoxysilane, g-mercaptopropyltrimethoxysilane. Titanates include those developed by S. J. Monte et al. in Ann. Chem. Tech Conf. SPI (1980), Ann. Tech Conf. Reinforced Plastics and Composite inst. SPI 1979, Section 16E, New Orleans; and S. J. Monte, Mod. Plastics Int., volume 14 (1984), no. 6. pg. 2. Zirco-aluminates include those described by L. B. Cohen in Plastics Engineering, volume 39, (1983), no. 11, pg. 29. The adhesion promoter may be included in the thermosetting resin itself, or coated onto any of the fillers described above to improve adhesion between the filler and the thermosetting resin. For example such promoters may be used to coat a silicate fiber or filler to improve adhesion of the resin matrix.

Fillers may also include lubricants such as fatty alcohols and their dicarboxylic acid esters including cetyl, stearyl and tall oil alcohol, distearyl adipate, distearyl phthalate, fatty acid esters of glycerol and other short chain alcohols including glycerol monooleate, glycerol monostearate, glycerol 12-hydroxystearate, glycerol tristearate, trimethylol propane tristearate, pentaerythritol tetrastearate, butyl stearate, isobutyl stearate, stearic acids, 12-hydroxystearic acid, oleic acid amide, erucamide, bis(stearoyl)ethylene diamine, calcium stearate, zinc stearate, neutral lead stearate, dibasic lead stearate, stearic acid complex esters, oleic acid complex esters, calcium soap containing complex esters, fatty alcohol fatty acid esters including isotridecyl stearate, cetyl palmitate, stearyl stearate, behenyl behenate, montanic acid, montanic acid ethylene glycol esters, montanic acid glycerol esters, montanic acid pentaerythritol esters, calcium soap containing montanic acid esters, calcium montanate, sodium montanate; linear or branched polyethylene, partially saponified polyethylene wax, ethylene-vinyl acetate copolymer, crystalline polyethylene wax; natural or synthetic paraffin including fully refined wax, hardened paraffin wax, synthetic paraffin wax, microwax, and liquid paraffin; fluoropolymers including polytetrafluoroethylene wax, copolymers with vinylidene fluoride, and mixtures comprising at least one of the foregoing lubricants.

Fillers may also include buckminsterfullerenes, conductive carbon fibers, vapor-grown carbon fibers, nanotubes, aerogels and xerogels. Preferred vapor-grown carbon fibers include those having an average diameter of about 3.5 to about 500 nanometers as described in, for example, U.S. Pat. Nos. 4,565,684 and 5,024,818 to Tibbetts et al.; U.S. Pat. No. 4,572,813 to Arakawa; U.S. Pat. Nos. 4,663,230 and 5,165,909 to Tennent; U.S. Pat. No. 4,816,289 to Komatsu et al.; U.S. Pat. No. 4,876,078 to Arakawa et al.; U.S. Pat. No. 5,589,152 to Tennent et al.; and U.S. Pat. No. 5,591,382 to Nahass et al.

Organic fillers such as thermoplastics and rubbers or elastomers may also be used. Examples of thermoplastics include powdery engineering resins, such as polycarbonate, thermoplastic polyester, polyestercarbonate, polyphenylene ether, polysulfone, polyether sulfone, and polyacrylate; powdery polyolefins, such as polyethylene, polypropylene and poly-4-methyl pentene-1; fluoroplastics, such as polytetrafluoroethylene, tetrafluoroethylene-propylene copolymer; chlorinated polyethylene; ethylene vinylacatate copolymers; polyacrlyates such as polybutyl acrylate, poly (2-hexyl acrylate); core-shell impact modifiers, such as polymethylmethacrylate-polybutylacrylate, poly (acrylonitrile-butadiene-styrene), poly(styrene-acrylonitrile) copolymers, poly(methylmethacrylate-butadiene-styrene) terpolymers; polyphenylene ether; ethylene propylene rubbers including diene modified ethylene propylene rubbers, and butadiene/styrene block copolymers.

Fillers may also include organic fillers such as rubbers, including acrylate-butadiene rubber, copolymers of ethyl acrylate (or other acrylates) and a small amount of a monomer that facilitates vulcanization (acrylic rubber), terpolymer from tetrafluoroethylene, trifluoronitrosomethane, and nitroso-perfluorobutyric acid (nitroso rubber), ethylacrylate-acrylonitrile copolymer (acrylate rubber), alkylene sulfide rubber, urethane rubber based on polyester, butadiene rubber (polybutadiene), bromobutyl rubber, chlorobutyl rubber, polychlorotrifluoroethylene (fluoro rubber), chloropolyethylene, epichlorohydrin homopolymer rubber (polychloromethytoxiran), chloroprene rubber (polychloroprene), chlorosulfonylpolyethylene, ethylene-ethyl acrylate copolymer (e.g., VAMAC®), copolymer of ethylene oxide (oxiran) and chloromethyloxiran (epichlorohydrin rubber), epoxidized natural rubber, ethylene-propylene-diene terpolymer, ethylene-propylene copolymer, urethane rubber based on polyether, epichlorohydrin-ethyleneoxide terpolymer, ethylene-vinylacetate copolymer, methyl silicone rubber with fluoro groups, rubber having fluoro or fluoroalkyl or fluoroalkoxy substituent groups on the polymer chain, copolymer from propylene oxide and allyl glycidyl ether, hydrogenated nitrile rubber, isobutylene-isoprene rubber (butyl rubber), polyisobutene, synthetic isoprene rubber, liquid silicone rubber, methyl silicone rubber, acrylonitrile-butadiene rubber, acrylonitrile-chloroprene rubber acrylonitrile-isoprene rubber, isoprene rubber, polyglycol ether, vinylpyridine-butadiene rubber, polyethylene, and methyl silicone rubber with phenyl groups.

Fillers may also include polyfluoralkoxyphosphazene, polynorbornene, propyleneoxide rubber, polypropylene, vinylpyridine-styrene-butadiene rubber, urethane rubbers, methyl silicone rubber with phenyl and vinyl groups, styrene-butadiene rubber, styrene-butadiene-styrene block copolymer (thermoplastic elastomer), styrene-chloroprene rubber, polysiloxane treated EPDM, styrene-isoprene rubber, styrene-isoprene-styrene block copolymer (thermoplastic elastomer), polythioglycol ether, tetrafluoroethylene, polysulfide rubbers, trans-polyoctenamer, trans-polypentenamer, thermoplastic elastomers, thermoplastic polyolefins, thermoplastic polyurethanes, methyl silicone rubber with vinyl groups, crosslinkable polyethylene, emulsion polymer, solution polymer, oil-extended rubber, poly(vinylchloride-co-vinyl acetate-co acrylic acid), poly(ethylene-co-vinylacetate-co-acrylic acid).

Fillers may also include blowing agents such as azo compounds like diazoaminobenzene, azobisisobutyronitrile, azodicarbonamide, azodicarbonic acid, benzene sulfonyl hydrazide, benzene-1,3-disulfonylhydrazide, diphenyloxide4,4'-disulfonylhydrazide, p-toluenesulfonic acid hydrazide, N,N'dinitrosopentamethylenetetraamine, N,N-dimethyl-N,N'-dinitrosophthalamide, and sodium carbonate blends with acidic compounds such as tartaric acid.

In a preferred embodiment, the curable resin composition comprises about 30 to about 70 parts of an unsaturated polyester; about 15 to about 50 parts of an alkenyl aromatic monomer; and about 0.1 to about 12 parts of a capped poly(arylene ether); wherein all amounts are based on 100 parts resin.

In a highly preferred embodiment, the composition comprises about 30 to about 70 parts of an unsaturated polyester; about 15 to about 50 parts styrene; about 1 to about 8 parts of a capped poly(arylene ether) having an intrinsic viscosity of about 0.10 to about 0.35 dL/g; about 0.1 to about 4 parts of a curing catalyst; and about 0.01 to about 1 parts of a curing promoter; wherein all amounts are based on 100 parts resin.

It will be understood that the invention includes uncured, partially cured, and fully cured compositions.

There is no particular limitation on the methods by which the curable resins are processed. Suitable methods include, for example, hand lay-up and spray lay-up, casting, sheet molding, bulk molding, injection molding, pultrusion, vacuum impregnation, and the like.

There is no particular limitation on the method by which the composition may be cured. The composition may, for example, be cured thermally or by using irradiation techniques, including UV irradiation and electron beam irradiation.

In a preferred embodiment, the composition is suitable for low-temperature curing. For example, the composition may be cured under conditions comprising a curing temperature not greater than about 50° C. (preferably not greater than about 40° C., more preferably not greater than about 30° C.) and a curing time not greater than about 5 hours (preferably not greater than about 1 hour, more preferably not greater than about 30 min). A cured composition will preferably exhibit a Barcol surface hardness measured according to ASTM D2583 of at least about 30, more preferably at least about 40.

The invention is further illustrated by the following non-limiting examples.

EXAMPLES 1–6

Comparative Examples 1–6

The unsaturated polyester resin system used in these examples was the proprietary resin obtained from Ashland as Q6585. It is described by its manufacturer as "high-reactivity, thickenable, polyester resin for use in low profile and controlled shrink applications." The datasheet supplied with the material indicates a styrene content of 35 weight percent. In Examples 1–6, the LPA was a capped poly (arylene ether). Specifically, the capped poly(arylene ether)s were methacrylate-capped poly(2,6-dimethylphenyl ether)s (PPE-MAA) having intrinsic viscosities of 0.12 and 0.31 dl/g as measured in chloroform at 23° C. The capped poly(arylene ether)s were prepared by reaction of the corresponding uncapped polyarylene ethers with methacrylic anhydride, using procedures described in U.S. patent application Ser. No. 09/440,747, filed Nov. 16, 1999. A commercial LPA containing a polyvinyl acetate, obtained as LP-40A from Union Carbide, was used as comparison. The initiator package was mixture of the curing catalyst methylethyl ketone peroxide (MEKP) and the curing promoter cobalt ethylhexanote.

The compounding was conducted as follows. Styrene was weighed into a disposable beaker and to this was added the LPA. In the case of PPE-MAA, the mixture was then heated briefly (less than 10 minutes) on a water bath at about 60° C. with hand mixing until complete dissolution was achieved. To this mixture was then added the Q6585 resin. Once mixed thoroughly, the curing catalyst, MEKP, was added using a calibrated syringe. When the resulting mixture was sufficiently mixed, the curing promoter was then added, again using a calibrated syringe. The individual mixtures were then poured into molds and placed in an air convection oven set at 35° C.

The onset of gelling occurred within the range of one half to two hours, each with a substantial exotherm, after which the parts appeared hard and cured. Generally, samples containing the PPE-MAA cured in short times, and those without PPE-MAA took longer. The molds were then taken from the oven and allowed to cool to ambient conditions. The samples were allowed to sit for 24 hours before their final length was measured. The percent shrinkage was calculated by comparing the initial length to the final length, where the initial length is the length of the mold, and the final length is the length of the molded bar after curing and 24 hours at ambient conditions.

The results are presented in Table 1 and show that the compositions of Examples 1–6, with a capped poly(arylene ether), exhibit reduced shrinkage compared to compositions with polyvinyl acetate and those with no LPA. As shown in FIG. 1, compositions of the invention also exhibit reduced brittleness. In particular, the sample labeled #2 ("UPR +4% Unsat.-PPE"), corresponding to Example 1 of Table 1, is uncracked, whereas the samples labeled #1 ("UPR +4% PVA") and #3 ("UPR neat"), corresponding to Comparative Examples 1 and 2, respectively, of Table 1, exhibit multiple cracks and fractures.

TABLE 1

|  | C. Ex. 1 | C. Ex. 2 | C. Ex. 3 | C. Ex. 4 | C. Ex. 5 | C. Ex. 6 | Ex. 1 | Ex. 2 | Ex. 3 | Ex. 4 | Ex. 5 | Ex. 6 |
|---|---|---|---|---|---|---|---|---|---|---|---|---|
| LPA TYPE | none | none | none | PVA | PVA | PVA | PPE.12 | PPE.12* | PPE.12 | PPE.31 | PPE.31** | PPE.31 |
| LPA LEVEL | 0.00% | 0.00% | 0.00% | 2.00% | 4.00% | 6.00% | 2.00% | 4.00% | 6.00% | 2.00% | 4.00% | 6.00% |
| BATCH SIZE (g) | 130.00 | 130.00 | 130.00 | 130.00 | 130.00 | 130.00 | 130.00 | 130.00 | 130.00 | 130.00 | 130.00 | 130.00 |
| Styrene (g) | 15.60 | 15.60 | 15.60 | 15.60 | 15.60 | 15.60 | 15.60 | 15.60 | 15.60 | 15.60 | 15.60 | 15.60 |
| LPA (g) | 0.00 | 0.00 | 0.00 | 2.60 | 5.20 | 7.80 | 2.60 | 5.20 | 7.80 | 2.60 | 5.20 | 7.80 |
| Resin (g) | 112.97 | 112.97 | 112.97 | 110.37 | 107.77 | 105.17 | 110.37 | 107.77 | 105.17 | 110.37 | 107.77 | 105.17 |
| curing catalyst (mL; d = 1.200; 1.00 wt %) | 1.16 | 1.16 | 1.16 | 1.16 | 1.16 | 1.16 | 1.16 | 1.16 | 1.16 | 1.16 | 1.16 | 1.16 |
| curing promoter (mL; d = 0.8874; 0.10 wt %) | 0.15 | 0.15 | 0.15 | 0.15 | 0.15 | 0.15 | 0.15 | 0.15 | 0.15 | 0.15 | 0.15 | 0.15 |
| Initial length (mm) | 254.00 | 254.00 | 254.00 | 254.00 | 254.00 | 254.00 | 254.00 | 254.00 | 254.00 | 254.00 | 254.00 | 254.00 |
| Final length (mm) | 245.50 | 245.50 | 245.50 | 244.50 | 246.00 | 248.00 | 248.00 | 249.00 | 249.00 | 248.00 | 248.00 | 249.00 |
| Curing Shrinkage (%) | 3.3 | 3.3 | 3.3 | 3.7 | 3.1 | 2.4 | 2.4 | 2.0 | 2.0 | 2.4 | 2.4 | 2.0 |

*methacrylate-capped poly(2,6-dimethylphenyl ether) having an intrinsic viscosity of 0.12 dL/g
**methacrylate-capped poly(2,6-dimethylphenyl ether) having an intrinsic viscosity of 0.31 dL/g

EXAMPLE 7

Comparative Examples 7–10

Using the procedures described above, seven samples containing the unsaturated polyester resin Ashland Q6585 were prepared with variations in poly(arylene ether) capping (none or methacrylate cap), intrinsic viscosity (0.12, 0.25, or 0.31 dL/g), and amount. All samples were cured for 16 hours at 35° C. The results are presented in Table 2 and show that Example 8, with a methacrylate-capped poly(arylene ether), cured more rapidly than compositions with uncapped poly (arylene ether)s or with no LPA.

TABLE 2

|  | C. Ex. 7 | C. Ex. 8 | C. Ex. 9 | C. Ex. 10 | Ex. 7 |
|---|---|---|---|---|---|
| LPA TYPE | none | PPE | PPE | PPE | PPE |
| LPA LEVEL | 0.00% | 5.00% | 5.00% | 5.00% | 5.00% |

TABLE 2-continued

|  | C. Ex. 7 | C. Ex. 8 | C. Ex. 9 | C. Ex. 10 | Ex. 7 |
| --- | --- | --- | --- | --- | --- |
| poly(arylene ether) intrinsic viscosity (dL/g) | NA | 0.12 | 0.31 | 0.25 | 0.12 |
| poly(arylene ether) cap | — | none | none | none | MA* |
| BATCH SIZE (g) | 35.5 | 35.5 | 35.5 | 35.5 | 35.5 |
| styrene (g) | 1.78 | 1.78 | 3.55 | 3.55 | 1.78 |
| poly(arylene ether) (g | 0.00 | 1.78 | 1.78 | 1.78 | 1.78 |
| Resin (g) | 33.33 | 31.56 | 29.78 | 29.78 | 31.56 |
| MEKP (mL; d = 1.1200) | 0.32 | 0.32 | 0.32 | 0.32 | 0.32 |
| curing promoter (mL; d = 0.8874) | 0.040 | 0.040 | 0.040 | 0.040 | 0.040 |
| Condition after 16 hrs | Gelled, Not cured | Liquid | Liquid, inhomogen | Liquid, inhomogen | Hardened |

*MA = methacrylate

EXAMPLES 8–13

Comparative Example 11

Figure 2:
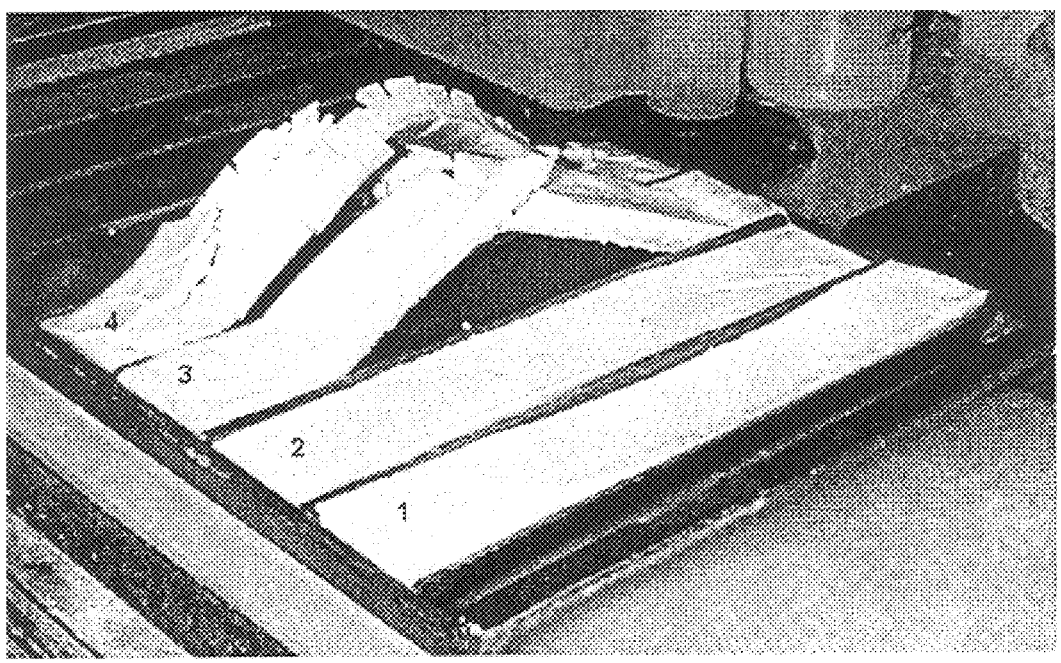
FIG. 2 is an image of molded UPR compositions comprising, from lower right to upper left, 0, 2, 4, and 6 weight percent capped poly(arylene ether). See Examples 8–13 and Comparative Example 11.

Seven samples were prepared with variations in capped poly(arylene ether) intrinsic viscosity and amount. The unsaturated polyester resin (UPR) used in these samples was a proprietary resin obtained from Alpha Owens Corning as AOC XV2346, which is described by its manufacturer as containing 40–60% styrene and 40–60% solids. The capped poly(arylene ether)s were methacrylate-capped poly(2,6-dimethylphenyl ether)s having intrinsic viscosities of 0.12 and 0.31 dL/g, prepared according to the procedure referenced above. For all samples, the curing promoter was cobalt naphthanate. All samples were cured for about 24 24 hours at 25° C. The compositions and curing shrinkage results are presented in Table 3. The results indicate that a moderate amount (2% or 4%) of either capped poly(arylene ether) reduced curing shrinkage, while higher amounts caused expansion. FIG. 2 shows images of four of the molded compositions comprising capped poly(arylene ether) having an intrinsic viscosity of 0.12 dL/g, sample labels in the figure corresponding to example numbers as follows: 1=C. Ex. 11; 2=Ex. 8; 3=Ex. 9; 4=Ex. 10. The figure shows that the sample labeled (1), corresponding to C. Ex. 11 with no added capped poly(arylene ether), exhibited shrinkage, whereas the sample labeled (2), corresponding to Ex. 8 with 2 weight percent methacrylate-capped poly (arylene ether) having an intrinsic viscosity of 0.12 dL/g, exhibited reduced shrinkage; Exs. 9 and 10, with 4 weight percent and 6 weight percent methacrylate-capped poly (arylene ether), respectively, exhibited expansion.

TABLE 3

|  | C. Ex. 11 | Ex. 8 | Ex. 9 | Ex. 10 | Ex. 11 | Ex. 12 | Ex. 13 |
| --- | --- | --- | --- | --- | --- | --- | --- |
| Resin type | UPR | UPR | UPR | UPR | UPR | UPR | UPR |
| Poly(arylene ether) intrinsic viscosity (dL/g) | — | 0.12 | 0.12 | 0.12 | 0.31 | 0.31 | 0.31 |
| Poly(arylene ether) amount (weight percent) | 0.00 | 2.00 | 4.00 | 6.00 | 2.00 | 4.00 | 6.00 |
| Batch size (g) | 142.00 | 142.00 | 142.00 | 142.00 | 142.00 | 142.00 | 142.00 |
| Styrene (g) | 17.04 | 17.04 | 17.04 | 17.04 | 17.04 | 17.04 | 17.04 |
| Poly(arylene ether) (g) | 0.00 | 2.84 | 5.68 | 8.52 | 2.84 | 5.68 | 8.52 |
| Resin amount (g) | 122.48 | 119.64 | 116.80 | 113.96 | 119.64 | 116.80 | 113.96 |
| Curing Promoter (mL; d = 0.8874 g/mL; 0.25 wt %) | 0.40 | 0.40 | 0.40 | 0.40 | 0.40 | 0.40 | 0.40 |
| DMA (mL; d = 0.9560 g/mL; 0.20 wt %) | 0.30 | 0.30 | 0.30 | 0.30 | 0.30 | 0.30 | 0.30 |
| MEKP (mL; d = 1.1200 g/mL; 1.50 wt %) | 1.90 | 1.90 | 1.90 | 1.90 | 1.90 | 1.90 | 1.90 |
| Cure Temperature (° C.) | 25 | 25 | 25 | 25 | 25 | 25 | 25 |
| Volume Change (%) | −0.4 | −0.6 | * | * | −0.7 | +1.8 | +3.5 |

*not measured due to cracking on expansion

EXAMPLES 14–21

The components used for Examples 8–13 and Comparative Example 12–11 were used to study the effect of curing catalyst and curing promoter amount.

Compositions, curing conditions, and shrinkage results for eight compositions are presented in Table 4. The results show that the capped poly(arylene ether)s provide faster curing that can be used to reduce the amount of curing catalyst and curing promoter at a given curing time.

Figure 3:
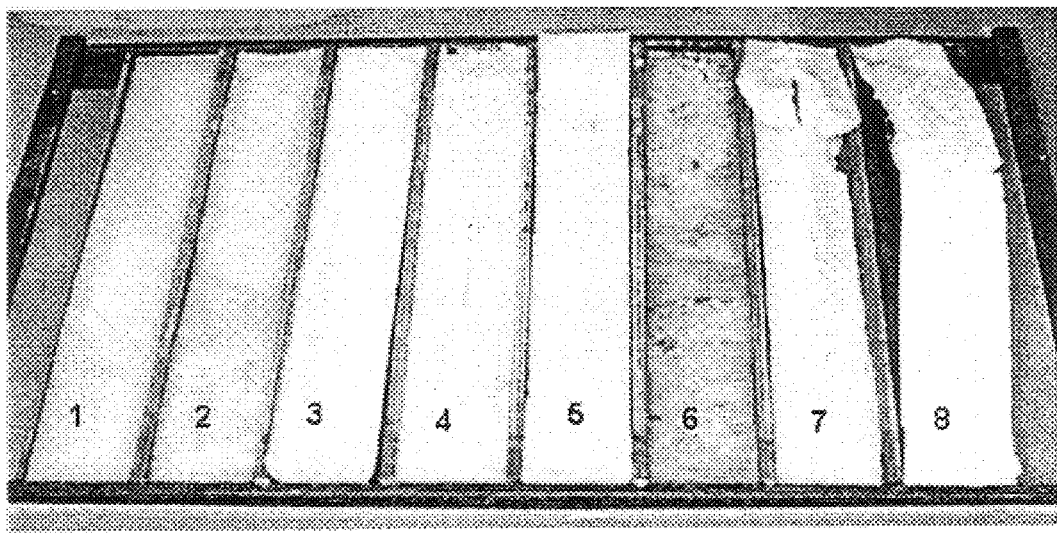
FIG. 3 is an image of parts molded from a composition comprising an unsaturated polyester, a capped poly(arylene ether), and varying levels of curing catalyst and curing promoter. See Examples 14–21.

Images of the eight molded parts, after curing, are provided in FIG. 3. The parts correspond, left to right, to Examples 14–21 in Table 4.

TABLE 4

|  | Ex. 14 | Ex. 15 | Ex. 16 | Ex. 17 | Ex. 18 | Ex. 19 | Ex. 20 | Ex. 21 |
|---|---|---|---|---|---|---|---|---|
| Resin Type | UPR | UPR | UPR | UPR | UPR | UPR | UPR | UPR |
| capped poly(arylene ether) intrinsic viscosity (dL/g) | 0.12 | 0.31 | 0.12 | 0.31 | 0.12 | 0.31 | 0.12 | 0.31 |
| capped poly(arylene ether) amount (wt %) | 4.00 | 4.00 | 4.00 | 4.00 | 4.00 | 4.00 | 4.00 | 4.00 |
| Batch Size (g) | 142.00 | 142.00 | 142.00 | 142.00 | 142.00 | 142.00 | 142.00 | 142.00 |
| Styrene amount (g) | 17.04 | 17.04 | 17.04 | 17.04 | 17.04 | 17.04 | 17.04 | 17.04 |
| capped poly(arylene ether) amount (g) | 5.68 | 5.68 | 5.68 | 5.68 | 5.68 | 5.68 | 5.68 | 5.68 |
| Resin amount (g) | 118.04 | 118.04 | 117.79 | 117.79 | 117.54 | 117.54 | 117.29 | 117.29 |
| Curing Promoter amount (mL; d = 0.8874 g/cc; 0.25 wt %) | 0.20 | 0.20 | 0.24 | 0.24 | 0.28 | 0.28 | 0.32 | 0.32 |
| DMA (mL; d = 0.9560 g/cc; 0.20 wt %) | 0.15 | 0.15 | 0.18 | 0.18 | 0.21 | 0.21 | 0.24 | 0.24 |
| MEKP (mL; d = 1.1200 g/cc; 1.50 wt %) | 0.95 | 0.95 | 1.14 | 1.14 | 1.33 | 1.33 | 1.52 | 1.52 |
| Cure Package Level | 50% | 50% | 60% | 60% | 70% | 70% | 80% | 80% |
| Cure Temperature (° C.) | 25 | 25 | 25 | 25 | 25 | 25 | 25 | 25 |
| Cure Time (hours and minutes) | 4 h 5 m | >5 h | 2 h 25 m | 2 h 25 m | 1 h 45 m | >5 h | 1 h 15 m | 1 h 15 m |
| Initial length (mm) | 254.0 | 254.0 | 254.0 | 254.0 | 254.0 | 254.0 | 254.0 | 254.0 |
| Final length (mm) | 252.0 | * | 253.0 | 253.5 | 253.0 | * | ** | ** |
| Volume Change (%) | −0.8 | — | −0.4 | −0.2 | −0.4 | — | — | — |

*length could not be measured because the part was incompletely cured
**length could not be measured because the part was fractured While the invention has been described with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents and other references are incorporated herein by reference in their entirety.

What is claimed is:

1. A curable resin composition comprising:
   an unsaturated polyester;
   an alkenyl aromatic monomer; and
   about 0.1 to about 12 parts of a capped poly(arylene ether) per 100 parts resin.

2. The curable resin composition of claim 1, wherein the unsaturated polyester is the reaction product of at least one polyhydric alcohol with at least one polybasic acid comprising an unsaturated polybasic acid.

3. The curable resin composition of claim 2, wherein the unsaturated polybasic acid is selected from the group consisting of maleic acid, fumaric acid, itaconic acid, citraconic acid, chloromaleic acid, dimeric methacrylic acid, nadic acid, tetrahydrophthalic acid, endo-methylenetetrahydrophthalic acid, hexachloro-endo-methylenetetrahydrophthalic acid, halogenated phthalic acids, the corresponding esters and anhydrides of the foregoing unsaturated polybasic acids, and mixtures comprising at least one of the foregoing unsaturated polybasic acids, esters, and anhydrides.

4. The curable resin composition of claim 2, wherein the polyhydric alcohol is selected from the group consisting of ethylene glycol, propylene glycol, diethylene glycol, dipropylene glycol, 1,2-butanediol, 1,3-butanediol, 1,4-butanediol, neopentyl glycol, glycerol, triethylene glycol, pentanediol, hexylene glycol, hydrogenated bisphenol A, bisphenol A-alkylene oxide adducts, tetrabromobisphenol A-alkylene oxide adducts, and mixtures comprising at least one of the foregoing polyhydric alcohols.

5. The curable resin composition of claim 2, wherein the polybasic acid further comprises a saturated or aromatic polybasic acid selected from the group consisting of succinic acid, adipic acid, sebacic acid, azelaic acid, dodecanedioic acid, eicoic acid, phthalic acid, isophthalic acid, terephthalic acid, the corresponding esters and anhydrides of the foregoing polybasic acids, and mixtures comprising at least one of the foregoing saturated or aromatic polybasic acids, esters, and anhydrides.

6. The curable resin composition of claim 1, wherein the unsaturated polyester is the reaction product of
   at least one polyhydric alcohol comprising propylene glycol;
   at least one unsaturated polybasic acid comprising maleic acid or maleic anhydride; and
   at least one aromatic polybasic acid comprising phthalic acid, phthalic anhydride, or isophthalic acid.

7. The curable resin composition of claim 1, comprising about 20 to about 80 parts of the unsaturated polyester per 100 parts resin.

8. The composition of claim 1, wherein the alkenyl aromatic monomer has the structure

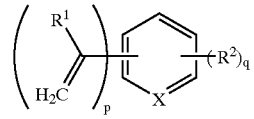

wherein each $R^1$ is independently selected from the group consisting of hydrogen and $C_1$–$C_{12}$ alkyl; each $R^2$ is independently selected from the group consisting of halogen, $C_1$–$C_{12}$ alkyl, and $C_1$–$C_{12}$ alkoxyl; X is nitrogen or carbon; p is 1 to 4; and q is 0 to 5.

9. The composition of claim 1, wherein the alkenyl aromatic monomer is selected from the group consisting of styrene, alpha-methylstyrene, 2-methylstyene, 3-methylstyrene, 4-methylstyrene, 2-t-butylstyrene, 3-t-butylstyrene, 4-t-butylstyrene, 1,3-divinylbenzene, 1,4-divinylbenzene, 1,3-diisopropdnylbenzene, 1,4-diisopropenylbenzene, styrenes having from 1 to 5 halogen substituents on the aromatic ring, vinylpyridine, 2,4-divinylpyridine, 2,5divinylpyridine, 2,6-divinylpyridine, 3,5-divinylpyridine, 2,4,6-trivinylpyridine, and mixtures comprising at least one of the foregoing alkenyl aromatic monomers.

10. The curable resin composition of claim 1, comprising about 10 to about 70 parts of the alkenyl aromatic monomer, based on 100 parts resin.

11. The curable resin composition of claim 1, wherein the capped poly(arylene ether) has the structure

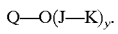

wherein Q is the residuum of a monohydric, dihydric, or polyhydric phenol; y is 1 to 100; J comprises recurring units having the structure

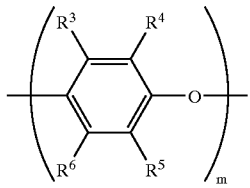

wherein $R^3$–$R^6$ are each independently selected from the group consisting of hydrogen, halogen, primary or secondary $C_1$–$C_{12}$ alkyl, $C_1$–$C_{12}$ alkenyl, $C_1$–$C_{12}$ alkynyl, $C_1$–$C_{12}$ aminoalkyl, $C_1$–$C_{12}$ hydroxyalkyl, phenyl, $C_1$–$C_{12}$ haloalkyl, $C_1$–$C_{12}$ aminoalkyl, $C_1$–$C_{12}$ hydrocarbonoxy, and $C_{C12}$ halohydrocarbonoxy, wherein at least two carbon atoms separate the halogen and oxygen atoms; m is 1 to about 200; and K is a capping group selected from the group consisting of

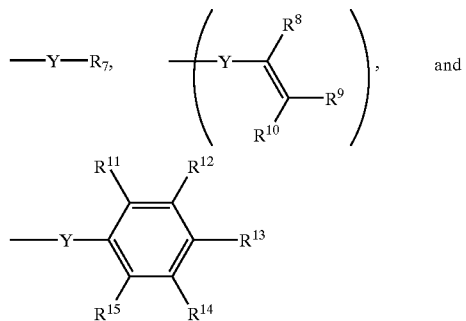

wherein $R^7$ is $C_1$–$C_{12}$ alkyl; $R^8$–$R^{10}$ are each independently selected from the group consisting of hydrogen, $C_1$–$C_{12}$ alkyl, $C_1$–$C_{12}$ alkenyl, $C_1$–$C_{12}$ aryl, $C_1$–$C_{12}$ mixed (alkyl-aryl), $C_1$–$C_{12}$ alkoxycarbonyl, $C_1$–$C_{12}$ aryloxycarbonyl, mixed (alkyl-aryl)oxycarbonyl, nitrile, formyl, carboxylate, imidate, and thiocarboxylate; $R_1$–$R^{15}$ are each independently selected from the group consisting of hydrogen, halogen, $C_1$–$C_{12}$ alkyl, hydroxy, and amino; and wherein Y is a divalent group selected from the group consisting of

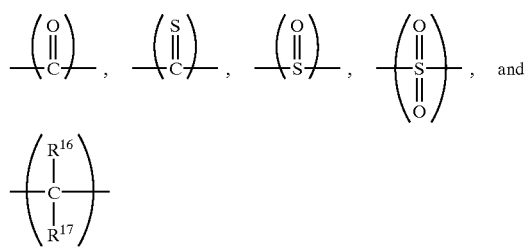

wherein $R^{16}$ and $R^{17}$ are each independently selected from the group consisting of hydrogen and $C_1$–$C_{12}$ alkyl.

12. The curable resin composition of claim 11, wherein Q is the residuum of a monohydric phenol.

13. The curable resin composition of claim 1, wherein the capped poly(arylene ether) comprises a capping group having the structure

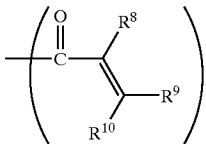

wherein $R_8$–$R^{10}$ are each independently selected from the group consisting of hydrogen, $C_1$–$C_{12}$ alkyl, $C_1$–$C_{12}$ alkenyl, $C_1$–$C_{12}$ aryl, $C_1$–$C_{12}$ mixed (alkyl-aryl), $C_1$–$C_{12}$ alkoxycarbonyl, $C_1$–$C_{12}$ aryloxycarbonyl, mixed (alkyl-aryl)oxycarbonyl, nitrile, formyl, carboxylate, imidate, and thiocarboxylate.

14. The curable resin composition of claim 1, wherein the capped poly(arylene ether) has an intrinsic viscosity of about 0.08 to about 0.40 deciliters per gram, as measured in chloroform at 23° C.

15. The curable resin composition of claim 1, wherein the capped poly(arylene ether) is substantially free of amino substituents.

16. The curable resin composition of claim 1, further comprising a curing catalyst.

17. The curable resin composition of claim 16, comprising not greater than about 1.5 parts of the curing catalyst per 100 parts resin.

18. The curable resin composition of claim 16, wherein the curing catalyst is selected from the group consisting of benzoyl peroxide, dicumyl peroxide, methyl ethyl ketone peroxide, lauryl peroxide, cyclohexanone peroxide, t-butyl hydroperoxide, t-butyl benzene hydroperoxide, t-butyl peroctoate, 2,5-dimethylhexane-2,5-dihydroperoxide, 2,5-dimethyl-2,5-di(t-butylperoxy)-hex-3-yne, di-t-butylperoxide, t-butylcumyl peroxide, alpha,alpha'-bis(t-butylperoxy-m-isopropyl)benzene, 2,5-dimethyl-2,5di(t-butylperoxy)hexane, dicumylperoxide, di(t-butylperoxy isophthalate, t-butylperoxybenzoate, 2,2-bis(t-butylperoxy) butane, 2,2-bis(t-butylperoxy)octane, 2,5-dimethyl-2,5-di(benzoylperoxy)hexane, di(trimethylsilyl)peroxide, trimethylsilylphenyltriphenylsilyl peroxide, 2,3-dimethyl-2,3-diphenylbutane, 2,3-trimethylsilyloxy-2,3diphenylbutane, and mixtures comprising at least one of the foregoing curing catalysts.

19. The curable resin composition of claim 1, further comprising a curing promoter.

20. The curable resin composition of claim 19, comprising not greater than about 0.2 parts of the curing promoter per 100 parts resin.

21. The curable resin composition of claim 19, wherein the curing promoter is selected from the group consisting of cobalt naphthanate, cobalt ethylhexanoate, N,N-dimethylaniline, N,N-diethylaminline, and mixtures comprising at least one of the foregoing curing promoters.

22. The curable resin composition of claim 1, further comprising at least one additive selected from the group consisting of flame retardants, flame retardant synergists, mold release agents and other lubricants, antioxidants, thermal stabilizers, ultraviolet stabilizers, pigments, dyes, colorants, anti-static agents, fibrous reinforcements, disc-shaped fillers, low-aspect ratio fillers, synthetic resins, natural resins, and thermoplastic elastomers.

23. The curable resin composition of claim 1, wherein the amount of the capped poly(arylene ether) is effective to reduce the curing shrinkage in anyone dimension by at least about 25% compared to the shrinkage of a corresponding composition without the capped poly(arylene ether).

24. The curable resin composition of claim 1, exhibiting a curing shrinkage in any one dimension not greater than about 3.0%; wherein curing shrinkage is defined by the equation $$S = 100\left(\frac{L_{before} - L_{after}}{L_{before}}\right)$$

wherein S is the curing shrinkage expressed as a percent, $L_{before}$ is the length before curing of a molded object comprising the composition, and $L_{after}$ is the length after curing of a molded object comprising the composition.

25. The curable resin composition of claim 1, wherein the composition is curable under conditions comprising a curing temperature not greater than about 50° C. and a curing time not greater than about 30 hours.

26. A curable resin composition, comprising:
   about 30 to about 70 parts of an unsaturated polyester;
   about 15 to about 50 parts of an alkenyl aromatic monomer; and
   about 0.1 to about 12 parts of a capped poly(arylene ether);
   wherein all amounts are based on 100 parts resin.

27. A curable resin composition, comprising:
   about 30 to about 70 parts of an unsaturated polyester;
   about 15 to about 50 parts styrene;
   about 1 to about 8 parts of a capped poly(arylene ether) having an intrinsic viscosity of about 0.10 to about 0.35 dL/g;
   about 0.1 to about 2.5 parts of a curing catalyst; and
   about 0.01 to about 1 parts of a curing promoter;
   wherein all amounts are based on 100 parts resin.

28. A cured or partially cured resin composition, comprising the reaction product of:
   an unsaturated polyester;
   an alkenyl aromatic compound; and
   about 0.1 to about 12 parts of a capped poly(arylene ether) per 100 parts resin.

29. An article comprising the composition of claim 28.

30. An automotive part comprising the composition of claim 28.

31. A method of preparing a curable resin composition, comprising:
   blending an alkenyl aromatic compound and about 0.1 to about 12 parts per 100 parts resin of a capped poly(arylene ether) to form a first blend; and
   blending the first blend and an unsaturated polyester to form a second blend.

32. A method of preparing a cured resin composition, comprising:
   blending an alkenyl aromatic compound and about 0.1 to about 12 parts per 100 parts resin of a capped poly(arylene ether) to form a first blend;
   blending the first blend and an unsaturated polyester to form a second blend; and
   curing the second blend at a temperature not greater than about 50° C. for a time not greater than about 30 hours.

* * * * *